Sept. 22, 1959 G. NATTA ET AL 2,905,646
CATALYSTS FOR THE POLYMERIZATION OF OLEFINES AND
PROCESS FOR PREPARING SAID CATALYSTS
Filed July 13, 1956
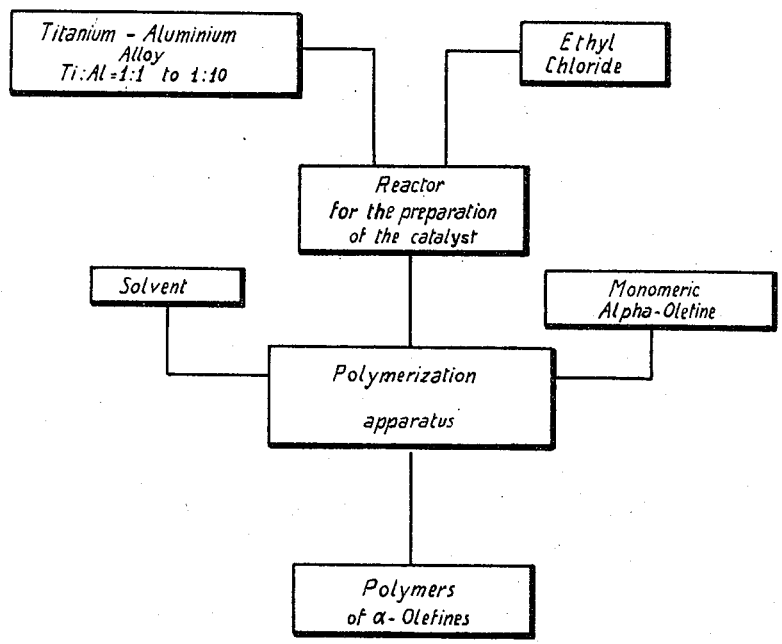
INVENTOR.
GIULIO NATTA
BY GIORGIO MAZZANTI
PAOLO LONGI
Toulmin & Toulmin
Attorneys United States Patent Office 2,905,646
Patented Sept. 22, 1959

2,905,646

**CATALYSTS FOR THE POLYMERIZATION OF OLE-
FINES AND PROCESS FOR PREPARING SAID
CATALYSTS**

Giulio Natta, Giorgio Mazzanti, and Paolo Longi, Milan,
Italy, assignors to Montecatini Societa Generale per
l'Industria Mineraria e Chimica, Milan, Italy Application July 13, 1956, Serial No. 597,817

Claims priority, application Italy July 15, 1955

17 Claims. (Cl. 252—431)

This invention relates to catalysts for use in the polymerization of olefines and to a process for preparing the catalysts.

Methods for preparing catalysts useful in the polymerization of olefines to linear, high molecular weight polymers and involving the reaction of titanium halides with aluminum alkyls or aluminum alloys, particularly aluminum-magnesium alloys have already been described.

However, in practice, the use of aluminum alkyls involves a certain hazard due to the fact that the aluminum alkyls are very easily oxidized, becoming pyrophoric. Various accidents have occurred both in laboratories and in pilot plants in the course of preparing the catalysts from aluminum alkyls.

The reduction of titanium halides with aluminum magnesium alloys avoids the use of the dangerous alkyls but involves the disadvantage that the alpha olefine polymers obtained by the use of the catalysts so prepared are scarcely crystalline. If, after the reaction of titanium tetrachloride and the aluminum-magnesium alloy, some unchanged titanium tetrachloride remains in the reaction product, the olefine polymers formed in the presence thereof are oily, liquid products similar to those obtained with Friedel-Crafts catalysts.

The object of the present invention is to provide new catalysts suitable for use in the production of crystalline polymers of alpha-olefines and a method for preparing them.

It is found, in accordance with this invention, that catalysts useful for the purpose stated can be obtained by reacting titanium alloys, in particular aluminum-titanium alloys, with compounds of the general formula RX, in which X is a halogen and R is an alkyl or aralkyl group.

It has been discovered, in fact, that it is possible, by reacting organic halides with aluminum-titanium alloys, to obtain reactive compounds the exact structure of which has not been established but which apparently contain aluminum and titanium bound to halogen and to carbon atoms and which are efficient catalysts in the polymerization of alpha-olefines to substantially linear, high molecular weight polymers of regular structure.

The production of the useful catalysts in the manner described was wholly unexpected. In fact, it was not known, prior to this invention, that metallic titanium could react with alkyl halides or with thhe aluminum or aluminum-alkyl halides which may be formed by reaction of the aluminum with said alkyl halides.

It could not even be predicted, prior to this invention, that under our reaction conditions stable organic titanium compounds could be formed.

Prior to our invention, organic titanium compounds have been understood to be extremely unstable even at low temperatures. Such instability was indicated in the papers by Herman and Nelson (Jr. Am. Chem. Soc. 74, 1952, 2693, and 75, 1953, 3877, 3882), in the case of the trihalogen and trialcoholate mono-alkyls of titanium prepared by the authors (according to a general method for the preparation of metallo alkyls) by reacting titanium tetrahalides or tetra-alcoholates with Grignard compounds or with lithium aryls at very low temperatures.

The present invention, based on our discovery that it is possible to react the titanium contained in an aluminum-titanium alloy with alkyl or aralkyl halides, provides a new and valuable method for preparing catalysts which are useful in the polymerization of the olefines.

According to the present method, the catalysts are obtained by oxidizing the titanium from valence zero to higher valences. This is in contrast to the methods known previously, according to which the catalysts were obtained by the reduction of titanium compounds.

The present catalysts also differ from those described in the pending application of Karl Ziegler, Ser. No. 514,068, filed June 8, 1955, and which were obtained from titanium tetrachloride and magnesium-aluminum alloys, in that the catalysts prepared according to the present method result in the production of polymerizates of the alpha-olefines which are richer in crystalline polymers.

The new catalysts may be prepared by simply contacting the aluminum-titanium alloy with the alkyl or aralkyl halide, at temperatures below 100° C. and preferably at temperatures of from 20 to 60° C.

The reaction between the titanium alloy and the alkyl halide takes place more readily if the alloy is very finely divided and consequently presents a large surface area. Further, it is essential for the surface of the alloy to be as free from oxides as possible.

The alloy can be obtained in finely divided condition suitable for reaction with the alkyl halide by mechanically grinding it to fine particle size in an atmosphere free from oxygen or by spraying the molten alloy in an atmosphere of an inert gas. In the method involving mechanical grinding of the alloy in any suitable apparatus as for instance a ball mill, the alkyl halide may be reacted with the alloy during the grinding operation carried out in an apparatus from which all of the oxygen has been previously removed, this grinding being performed at a temperature below 60° C. and in the range stated hereinabove.

In the alloy used, the ratio of titanium atoms to aluminum atoms may be between about 1:1 and 1:10, for example between 1:1.2 and 1:9. Optimum results have been obtained using alloys in which the ratio of titanium atoms to aluminum atoms is 1:3.

In the alkyl halides RX, R may be any alkyl radical, for instance from 2 to 18 carbon atoms, or any aralkyl radical of from 7 to 12 carbon atoms, and X is halogen, preferably chlorine or bromine. All other conditions being equal, the optimum results have been obtained using alkyl halides in which the halogen atom is bound to a primary carbon atom, and particularly ethyl chloride.

The reaction products thus obtained comprised aluminum and titanium compounds which decomposed in the presence of water, with formation of saturated hydrocarbons.

Small amounts of alloy, particularly to metallic titanium, resulting from an incomplete reaction between the alloy and alkyl halide during preparation of the catalyst are difficult to remove from the polymerized alpha-olefine if allowed to remain in the catalyst when the latter is used as aid in the polymerization. Therefore, such small amounts of unreacted alloy are preferably eliminated from the catalyst, after preparation thereof, by decantation of a suspension of the catalyst in an inert organic liquid, from the unreacted alloy, as shown in Example 2 below. The polymer obtained using the thus purified catalyst, is more readily purified and is free from metal.

Polymerization of the alpha-olefines with the aid of the present catalysts proceeds at low temperatures and pressures in practice in a manner similar to the polymerization carried out in the presence of the catalysts obtained by reacting aluminum alkyls with titanium salts.

Alternatively, the aluminum-titanium alloy in grannular form may be used in a fixed bed. After attacking the alloy superficially with the alkyl halide, polymerization is carried out passing a solution of the monomer through the catalyst so obtained, which can be reactivated, once it becomes inactive, by means of a fresh attack with the alkyl halide.

The polymerizates obtained, after decomposition of the catalyst, can be purified in known manner, i.e., by simple washing or by treatment with acids and swelling solvents. In the last-mentioned case, the polymer can be subsequently completely coagulated by treatment with methanol.

The following examples are given to illustrate specific embodiments of the invention, it being understood that these examples are not intended as limitative.

*Example 1*

Ten g. of an aluminum-titanium alloy containing 37.2% titanium (atom ratio Ti:Al=1:3) previously finely ground under nitrogen are introduced under nitrogen into a rotating autoclave of about 2 l. capacity, capable of functioning as a ball mill and containing 12 stainless steel balls of 1 inch diameter. 35 g. of ethyl chloride are then injected into the autoclave. The mixture is ground overnight at a temperature of 50° C., and the residual ethyl chloride is then removed completely under a vacuum of 20 mm. About 600 cc. of n-heptane are then added and soon thereafter ethylene is introduced into the autoclave up to a pressure of 30 atmospheres. The temperature rises spontaneously up to 103° C. while a rapid pressure drop down to 20 atmospheres is noticed. The pressure is brought again to 30 atmospheres by means of fresh ethylene and this operation is repeated several times, while the temperature remains at 100° C., although heating of the autoclave has ceased. After about 7 hours from the beginning, the introduction of ethylene is stopped, the autoclave is cooled, the residual gases are vented and the reaction product, consisting of a nearly white, powdery mass, is taken out. The polymer is at least partially purified from the inorganic products by suspending it in hot methanol acidified with hydrochloric acid, separated by filtration, washed with methanol, and vacuum dried in the heat.

570 g. of polyethylene are thus obtained; this polymer appears highly crystalline at an X-ray examination and has an intrinsic viscosity (in tetralin solution at 135° C.) of 0.80 and a molecular weight of 23,000.

*Example 2*

Ten g. of an aluminum-titanium alloy containing 37.2% of titanium are introduced under nitrogen into a rotating autoclave of about 2 l. capacity, capable of functioning as a ball mill and containing 12 stainless steel balls. 40 g. of ethyl chloride are added. The mixture is ground for several hours at a temperature of 60° C., then the unchanged ethyl chloride is evaporated under a vacuum of 20 mm. Finally, 500 cc. of n-heptane are introduced into the autoclave. The head of the autoclave is removed and, while keeping the autoclave upright, a plug provided with a glass siphon and with a cock for the introduction of nitrogen is fitted on its port. After a short time about 350 cc. of a brown suspension free from alloy powder are thus siphoned and collected in a glass flask. The suspension of catalyst is then introduced into a stainless steel shaking autoclave of 2,000 cc. capacity, which has been previously emptied of air, and 300 cc. of n-heptane are added. At a temperature of 40° C. ethylene is introduced up to a pressure of about 20 atmospheres. The polymerization of ethylene begins immediately and a rapid pressure decrease is noticed whereas the temperature rises spontaneously up to 80° C. Further ethylene is supplied up to a pressure of 30 atmospheres, while the reaction remains auto thermal at a temperature of 80° C. The polymerization is carried out at a pressure between 20 and 30 atmospheres, while supplying additional ethylene for a period of time of about 6 hours. After said period, the autoclave, which is almost completely full of a powdery solid polymer of a reddish-brown color, is emptied. The product is suspended in methanol, filtered, washed with methanol, and vacuum dried in the heat. 466 g. of polyethylene are thus obtained; it has an ash content of 0.9% and an intrinsic viscosity in tetralin solution at 135° C. equal to 7.3, corresponding to a molecular weight of about 670,000.

*Example 3*

Ten g. of a titanium-aluminum alloy containing 37.2% titanium, and 14 g. of ethyl bromide are introduced into the rotating autoclave described previously. After grinding for about 20 hours at a temperature of 50–60° C., the unreacted ethyl bromide is removed completely and 600 cc. of n-heptane are introduced into the autoclave. Ethylene is then introduced to a pressure of 40 atmospheres and the temperature is brought to 90° C. As a pressure decrease down to 20 atmospheres is noted, additional ethylene is introduced into the autoclave to a pressure of 40 atmospheres and this operation is repeated several times during a period of time of about 10 hours. Thereafter, the polymer obtained, similar in appearance to that of the preceding experiment, is discharged. After purification, 395 g. of polyethylene are obtained. This polyethylene appears highly crystalline at an X-ray examination and has an intrinsic viscosity of 9.2 and a molecular weight of 960,000.

*Example 4*

25 g. of an aluminum-titanium alloy containing 37.2% titanium, previously ground under nitrogen, are introduced under nitrogen into a rotating autoclave of about 2 l. capacity, capable of functioning as a ball mill and containing 10 stainless steel balls. Then 90 g. of ethyl bromide are introduced into the autoclave and the operation is continued as described in the foregoing example but without removing the ethyl bromide left unchanged at the end of the grinding operation. Ethylene is introduced into the autoclave to a pressure of 40 atmospheres. The temperature rises rapidly up to 90° C. while a pressure decrease down to 20 atmospheres is noticed. The pressure is brought then again to 40 atmospheres by means of an additional amount of ethylene. This operation is repeated several times during a period of time of about 5 hours. The autoclave is then allowed to cool and the reaction product, which appears as a very compact polymer mass, is withdrawn and purified from the inorganic materials present by hot treatment with acids. 272 g. of a solid polyethylene are thus obtained. This polymer, of very high crystallinity, has in tetralin solutions at 135° C. an intrinsic viscosity of 2.03 corresponding to a molecular weight of about 95,000.

*Example 5*

Proceeding similarly as described in the foregoing examples, 12 g. of an aluminum-titanium alloy containing 60% of titanium (atom ratio Ti:Al=1:6) reacted with 40 g. of ethyl chloride by grinding in an atmosphere of nitrogen. The unreacted ethyl chloride is then entirely removed, heptane is introduced into the autoclave and then ethylene up to a pressure of 20 atmospheres. The temperature is raised up to 100° C. and the autoclave is kept in agitation for some hours. From the reaction product small quantities of polyethylene are isolated.

*Example 6*

10 g. of an aluminum-titanium alloy containing 37.2% of titanium, previously ground under nitrogen, 12 stainless steel bills of 1 inch diameter and 40 g. of ethyl chloride are introduced into the milling autoclave previously described. The mixture is ground at temperatures between 40 and 50° C. and the unreacted ethyl chloride is removed under vacuum. 150 cc. of n-heptane and 300 g. of a propylene-propane mixture containing 91% of propylene are introduced into the autoclave and the temperature of the latter is raised up to 90° C. within 30 minutes. At this temperature the polymerization reaction begins and the temperature rises spontaneously in a short time up to 120° C. and drops then again slowly down to 100° C. About 4 hours after propylene has been introduced, the residual gas is vented and methanol is pumped into the autoclave. The reaction product is withdrawn, and purified by hot treatment with ether and hydrochloric acid, complete coagulation with methanol, filtering, and washing with methanol. The polypropylene obtained is than vacuum dried in the heat. 218 g. of a solid polypropylene are thus isolated. This product is fractionated by extraction with hot solvents in a Kumagawa extractor, so that the polymer to be extracted is at the boiling temperature of the solvent used in the extraction. The acetone extract corresponds to 16.6% of the polymer obtained and consists of oily low molecular weight products. The ether extract corresponds to 14.7% and consists of a solid polypropylene which appears amorphous at an X-ray examination and has an intrinsic viscosity of 0.55 in tetralin solution at 135° C. The heptane extract corresponds to 26.5% and consists of a polypropylene which appears partially crystalline at an X-ray examination. This fraction shows an intrinsic viscosity of 0.74 The residue of said extraction corresponds to 42.2% of the polymer obtained and consists of a polypropylene which appears highly crystalline at an X-ray examination and has an intrinsic viscosity of 3.60 (in tetralin solution at 135° C.) corresponding to a molecular weight of about 230,000.

*Example 7*

25 g. of an aluminum-titanium alloy (37.2% of titanium) and 30 cc. of ethyl bromide are introduced under nitrogen into the apparatus already described in the foregoing example. The whole is ground by making the autoclave revolve at a temperature of 50° C. 90 g. of a propylene-propane mixture containing 82% of propylene are then added and the mixture is heated to 85° C. After some hours, 160 g. of propylene-propane mixture are added again and the autoclave is kept in rotation for about 15 hours more at temperatures between 80 and 90° C. The unreacted propylene is discharged and the reaction product, which appears as a tacky solid mass, is withdrawn and treated first with methanol and then with acids to decompose the alloy present. 25.5 g. of a solid polypropylene are thus isolated. This product is fractionated by hot extraction with solvents. The acetone extract corresponds to 39% of the polymer obtained and consists of low molecular weight solid products. The ether extract corresponds to 13.5% and consists of an amorphous solid polypropylene having an intrinsic viscosity of 0.55 (determined in tetralin solution at 135° C.). The heptane extract corresponds to 20.3% and consists of a partially crystalline polypropylene having an intrinsic viscosity of 0.83. The residue of said extraction corresponds to 27.2% of the polymer obtained and consists of a highly crystalline polypropylene having an intrinsic viscosity of 2.35 (corresponding to a molecular weight of about 110,000).

*Example 8*

12 steel balls and 10 g. of freshly prepared turnings of a titanium-aluminum alloy containing 16.9% of titanium (atom ratio Ti:Al=1:9) are introduced into the milling autoclave previously described. The autoclave is closed and evacuated, then 40 g. of ethyl chloride are introduced into it and the whole is ground at temperatures between 40 and 50° C. The unreacted ethyl chloride is then removed under vacuum, and 400 cc. of n-heptane and 240 g. of propylene are introduced into the autoclave. The temperature is brought to 100° C. and the autoclave is kept in agitation for about 5 hours. Thereafter, the reaction product is extracted and purified as described in the foregoing examples. 45 g. of a white solid polypropylene of powdery appearance are thus obtained.

*Example 9*

10 g. of a titanium-aluminum alloy containing 37.2% of titanium, and 40 g. ethyl chloride are introduced under nitrogen into the milling autoclave described previously, and the whole is ground at temperatures between 60 and 70° C. All the ethyl chloride is removed under a vacuum of 20 mm. and 100 cc. of n-heptane and 160 g. of pentene-1 (Phillips pure grade) are introduced. The autoclave is kept in agitation at a temperature of 95° C. for about 5 hours. After said lapse of time 100 cc. of methanol are pumped into the autoclave. The autoclave is opened and a very viscous product is taken out. This product is purified by dissolution in an ether-heptane mixture, treatment with hydrochloric acid, and subsequent complete coagulation with methanol. The white solid product obtained is filtered and vacuum dried in the heat. 135 g. of a solid polypentene having an ash content of 0.06% are thus obtained. The solid polypentene is then fractionated by extraction with hot solvents. The acetone extract corresponds to 41.6% of the total polymer obtained and consists of oily low molecular weight products. The extract obtained with ethyl acetate corresponds to 16.7% and consists of a solid product of waxy appearance. The ether extract corresponds to 32.9% of the total polymer obtained and consists of a partially crystalline polypentene. The heptane extract corresponds to 8.75% and consists of a polypentene which appears highly crystalline at an X-ray examination.

The alpha olefines which may be polymerized with the aid of the new catalysts disclosed herein are those having the general formula

$$CH_2=CHR$$

in which R is hydrogen, or an aliphatic, alicyclic or aromatic radical. In the formula R may contain, when it is other than hydrogen, from 1 to 16 carbon atoms and in specific embodiments may be an alkyl, cycloalkyl or aryl radical.

The alpha-olefines embraced in the formula include ethylene, propylene, butene-1, pentene-1, hexene-1, and styrene. Mixtures of the alpha-olefines may be copolymerized.

The process, including the polymerization, is generally shown in the accompanying flow sheet.

Since in carrying out the invention changes and modifications may be made in the details given in the specific examples without departing from the scope of the disclosure and the spirit of the invention, it will be understood that it is not intended to limit the invention except as it is defined in the appended claims.

What is claimed is:

1. A catalyst for the polymerization of olefins to substantially linear high polymers of regular structure, said catalyst being an organometallic compound containing direct metal-to-carbon bonds and obtained by contacting an alloy of the metals titanium and aluminum in a ratio of 1:1 to 1:10 with an excess of a primary alkyl halide RX wherein R is an alkyl radical containing 2 to 18 carbon atoms and X is selected from the group consisting of chlorine and bromine, at a temperature between 20° C. and 100° C., until there is produced an organometallic compound containing direct metal-to-carbon bonds and in which the titanium is oxidized from zero valence to a higher valence, and then removing the unreacted alkyl halide.

2. A catalyst according to claim 1, and obtained by contacting the alloy of the metals titanium and aluminum with ethyl chloride.

3. A catalyst according to claim 1, and obtained by contacting an alloy of the metals titanium and aluminum in a ratio of 1:1 to 1:3 with the alkyl halide.

4. A catalyst according to claim 1, and obtained by contacting an alloy of the metals titanium and aluminum in a ratio of 1:1 to 1:3 with ethyl chloride.

5. A catalyst according to claim 1, and obtained by contacting an alloy of the metals titanium and aluminum in a ratio of 1:1 to 1:3 with ethyl bromide.

6. A catalyst according to claim 1, and obtained by contacting the alloy of the metals titanium and aluminum with ethyl bromide.

7. A process for preparing new catalysts for olefin polymerization, which process comprises contacting an alloy of the metals titanium and aluminum in a ratio of 1:1 to 1:10 with an excess of a primary alkyl halide RX wherein R is an alkyl radical containing 2 to 18 carbon atoms and X is selected from the group consisting of chlorine and bromine, at a temperature between 20° C. and 100° C. until there is produced an organometallic compound containing direct metal-to-carbon bonds, and in which the titanium is oxidized from zero valence to a higher valence, and then removing the unreacted alkyl halide.

8. The process according to claim 7, characterized in that the alloy of the metals titanium and aluminum is contacted with ethyl chloride.

9. The process according to claim 7, characterized in that the alloy of the metals titanium and aluminum is contacted with ethyl bromide.

10. The process according to claim 7, characterized in that an alloy of the metals titanium and aluminum in a ratio of 1:1 to 1:3 is contacted with the alkyl halide.

11. The process according to claim 7, characterized in that an alloy of the metals titanium and aluminum in a ratio of 1:1 to 1:3 is contacted with ethyl chloride.

12. The process according to claim 7, characterized in that an alloy of the metals titanium and aluminum in a ratio of 1:1 to 1:3 is contacted with ethyl bromide.

13. The process according to claim 7, characterized in that the alloy of the metals titanium and aluminum is contacted with the alkyl halide in an atmosphere of an inert gas and at a temperature of 20° C. to 60° C.

14. The process according to claim 7, characterized in that an alloy of the metals titanium and aluminum in a ratio of 1:1 to 1:3 is contacted with the alkyl halide in an atmosphere of an inert gas and at a temperature of 20° C. to 60° C.

15. The process according to claim 7, characterized in that an alloy of the metals titanium and aluminum in a ratio of 1:1 to 1:3 is contacted with ethyl chloride in an atmosphere of an inert gas and at a temperature of 20° C. to 60° C.

16. The process according to claim 7, characterized in that an alloy of the metals titanium and aluminum in a ratio of 1:1 to 1:3 is contacted with ethyl bromide in an atmosphere of an inert gas and at a temperature of 20° C. to 60° C.

17. A process for preparing new catalysts for olefin polymerization which process comprises mixing an alloy of the metals titanium and aluminum in a ratio of 1:1 to 1:10 with an excess of a primary alkyl halide RX in which R is an alkyl radical containing 2 to 18 carbon atoms and X is selected from the group consisting of chlorine and bromine, at a temperature between 20° C. and 100° C., to initiate reaction therebetween, interrupting the reaction when there has been produced an organometallic compound containing direct metal-to-carbon bonds and in which the titanium is oxidized from zero valence to higher valence, but before all of the alloy is consumed, and separating said organometallic compound from the unreacted alloy and alkyl halide.

References Cited in the file of this patent

UNITED STATES PATENTS

| | | |
|---|---|---|
| 2,388,428 | Mavity | Nov. 6, 1945 |
| 2,440,498 | Young et al. | Apr. 27, 1948 |
| 2,552,676 | Hill | May 15, 1951 |
| 2,741,629 | Cohen | Apr. 10, 1956 |

FOREIGN PATENTS

| | | |
|---|---|---|
| 533,362 | Belgium | May 16, 1955 |